United States Patent
Yumer et al.

(10) Patent No.: US 10,410,158 B1
(45) Date of Patent: Sep. 10, 2019

(54) SYSTEMS AND METHODS FOR EVALUATING CYBERSECURITY RISK

(71) Applicant: Symantec Corporation, Mountain View, CA (US)

(72) Inventors: Leylya Yumer, Antibes (FR); Laurent Heslault, Paris (FR); Roxane Divol, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 168 days.

(21) Appl. No.: 15/224,501

(22) Filed: Jul. 29, 2016

(51) Int. Cl.
*G06Q 40/08* (2012.01)
*G06Q 10/06* (2012.01)
*G06N 5/04* (2006.01)
*G06N 20/00* (2019.01)

(52) U.S. Cl.
CPC .......... *G06Q 10/0635* (2013.01); *G06N 5/04* (2013.01); *G06N 20/00* (2019.01); *G06Q 40/08* (2013.01)

(58) Field of Classification Search
CPC ........ G06Q 10/00; G06Q 20/00; G06Q 30/00; G06Q 40/00
USPC ....................................................... 705/3–44
See application file for complete search history.

(56) References Cited

U.S. PATENT DOCUMENTS

| | | | | |
|---|---|---|---|---|
| 9,294,498 | B1* | 3/2016 | Yampolskiy | H04L 63/1433 |
| 9,652,597 | B2* | 5/2017 | Roundy | G06F 21/10 |
| 9,830,569 | B2* | 11/2017 | Dahlberg | G06Q 10/0635 |
| 2016/0171415 | A1* | 6/2016 | Yampolskiy | H04L 63/1433 705/7.28 |
| 2016/0173521 | A1* | 6/2016 | Yampolskiy | H04L 63/1433 726/25 |
| 2016/0248797 | A1* | 8/2016 | Yampolskiy | H04L 63/1433 |
| 2016/0330228 | A1* | 11/2016 | Knapp | H04L 63/1433 |
| 2017/0195349 | A1* | 7/2017 | Shabtai | H04L 63/1416 |

OTHER PUBLICATIONS

CCS Insurance; https://www.ccsinsurance.com/; Feb. 2, 2009.

* cited by examiner

*Primary Examiner* — Frantzy Poinvil
(74) *Attorney, Agent, or Firm* — FisherBroyles, LLP

(57) ABSTRACT

A computer-implemented method for evaluating cybersecurity risk may include (i) identifying telemetry data collected from endpoints of an entity, (ii) calculating a cybersecurity risk score for the entity by searching the telemetry data for information indicative of cybersecurity risk exposure of the entity and performing an actuarial analysis on the information indicative of the cybersecurity risk exposure to quantize a potential consequence of the cybersecurity risk exposure, and (iii) performing, based on the cybersecurity risk score, a security action to protect the entity from the potential consequence of the cybersecurity risk exposure. Various other methods, systems, and computer-readable media are also disclosed.

20 Claims, 6 Drawing Sheets

SYSTEMS AND METHODS FOR EVALUATING CYBERSECURITY RISK

BACKGROUND

Cybersecurity risk is typically assessed based on known information about the security of an entity, such as a computer or an organization, that may be at risk of attacks. For example, an organization may respond to questionnaires about the types of cybersecurity measures it takes to prevent security breaches. Those questionnaires may then be used to evaluate a potential risk of the organization.

However, information obtained from questionnaires is often incomplete and may not accurately capture the large number of factors that influence the risk of an entity being attacked. Furthermore, such information may lack of historical risk data for an entity. As a result, information from questionnaires, as well as from other traditional methods of gathering cybersecurity risk information of an entity, may not provide an accurate picture of the cybersecurity exposure of an entity. Accordingly, the instant disclosure identifies and addresses a need for additional and improved systems and methods for evaluating cybersecurity risk.

SUMMARY

As will be described in greater detail below, the instant disclosure generally relates to systems and methods for evaluating cybersecurity risk by using various information extracted from telemetry data to predict a risk score for an entity. In one example, a computer-implemented method for evaluating cybersecurity risk may include (i) identifying telemetry data collected from endpoints of an entity, (ii) calculating a cybersecurity risk score for the entity by searching the telemetry data for information indicative of cybersecurity risk exposure of the entity and performing an actuarial analysis on the information indicative of the cybersecurity risk exposure to quantize a potential consequence of the cybersecurity risk exposure, and (iii) performing, based on the cybersecurity risk score, a security action to protect the entity from the potential consequence of the cybersecurity risk exposure. Additionally or alternatively, in other examples, the computer-implemented method may further include identifying additional telemetry data collected from endpoints of at least one additional entity, wherein searching the telemetry data may include searching the additional telemetry data for the information indicative of cybersecurity risk exposure of the entity.

In one embodiment, the information indicative of the cybersecurity risk exposure may include information indicative of a historical risk of cyber attacks on the entity, a current risk of cyber attacks on the entity, and a value of the entity. In this embodiment, the information indicative of the historical risk of cyber attacks may include information about a previous attack on the entity, a previous attack on a similar entity, and/or a remediation of the previous attack. Additionally or alternatively, in this embodiment, the information indicative of the current risk of cyber attacks on the entity may include a security risk posed by a third-party entity with access to a resource of the entity and/or a security practice of the entity. Furthermore, in this embodiment, the information indicative of the value of the entity may include information indicative of a value of a digital asset of the entity and/or a reputation of the entity.

In some examples, performing the actuarial analysis may include extracting features from the information indicative of the cybersecurity risk exposure and using the extracted features to train a prediction model to calculate the cybersecurity risk score for the entity.

In some embodiments, performing the security action may include using the cybersecurity risk score to derive a cost of insuring the entity against cyber attacks. Additionally or alternatively, the computer-implemented method may further include determining that the cybersecurity risk score is above a risk threshold. In such embodiments, performing the security action may include automatically increasing cybersecurity protection within the entity in response to determining that the cybersecurity risk score is above the risk threshold.

In one example, the computer-implemented method may further include calculating the cybersecurity risk score for the entity by aggregating individual cybersecurity risk scores of component entities that comprise the entity into an overall score.

In one embodiment, a system for implementing the above-described method may include (i) an identification module, stored in memory, that identifies telemetry data collected from endpoints of an entity, (ii) a calculation module, stored in memory, that calculates a cybersecurity risk score for the entity by searching the telemetry data for information indicative of cybersecurity risk exposure of the entity and performing an actuarial analysis on the information indicative of the cybersecurity risk exposure to quantize a potential consequence of the cybersecurity risk exposure, and (iii) a performance module, stored in memory, that performs, based on the cybersecurity risk score, a security action to protect the entity from the potential consequence of the cybersecurity risk exposure. In addition, the system may include at least one processor that executes the identification module, the calculation module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify telemetry data collected from endpoints of an entity, (ii) calculate a cybersecurity risk score for the entity by searching the telemetry data for information indicative of cybersecurity risk exposure of the entity and performing an actuarial analysis on the information indicative of the cybersecurity risk exposure to quantize a potential consequence of the cybersecurity risk exposure, and (iii) perform, based on the cybersecurity risk score, a security action to protect the entity from the potential consequence of the cybersecurity risk exposure.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of representative embodiments and are a part of the specification. Together with the following description, these drawings demonstrate and explain various principles of the instant disclosure.

Figure 1:
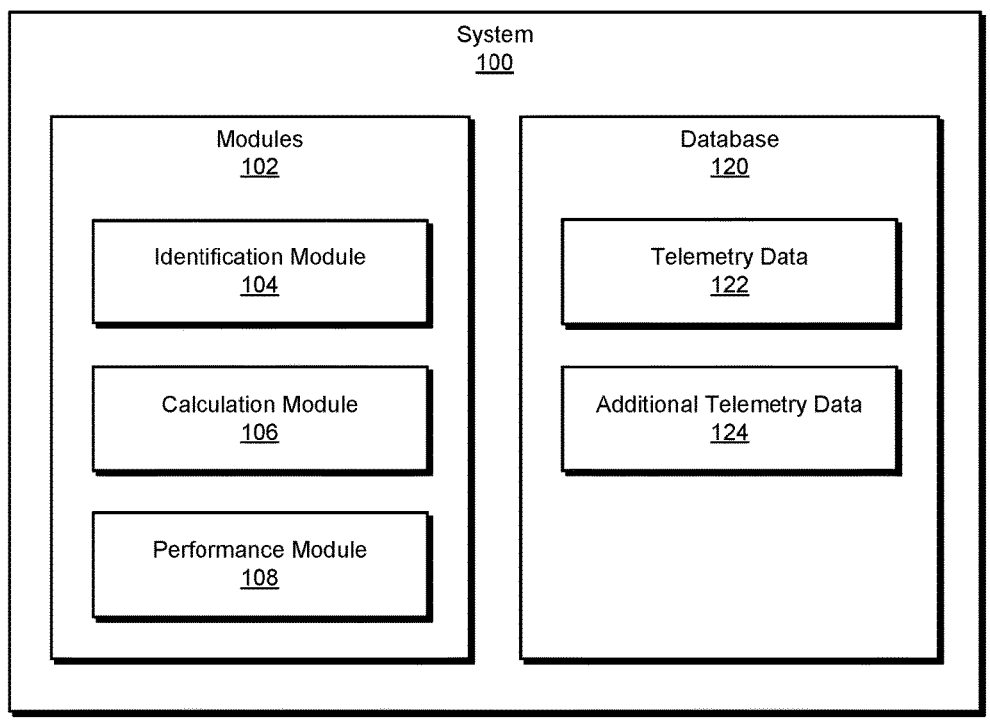
FIG. 1 is a block diagram of a representative system for evaluating cybersecurity risk.

Throughout the drawings, identical reference characters and descriptions indicate similar, but not necessarily identical, elements. While the representative embodiments described herein are susceptible to various modifications and alternative forms, specific embodiments have been shown by way of example in the drawings and will be described in detail herein. However, the representative embodiments described herein are not intended to be limited to the particular forms disclosed. Rather, the instant disclosure covers all modifications, equivalents, and alternatives falling within the scope of the appended claims.

DETAILED DESCRIPTION OF REPRESENTATIVE EMBODIMENTS

The present disclosure is generally directed to systems and methods for evaluating cybersecurity risk. As will be explained in greater detail below, by evaluating detailed telemetry data on multiple entities, the systems and methods disclosed herein may ascertain potential future cybersecurity risks for an entity. For example, by training a prediction model with data on historical attacks, current vulnerabilities, and the value of the entity, the disclosed systems and methods may predict a possibility of the entity subsequently being attacked. The disclosed systems and methods may then determine costs and actions needed to insure and protect the entity.

Figure 2:
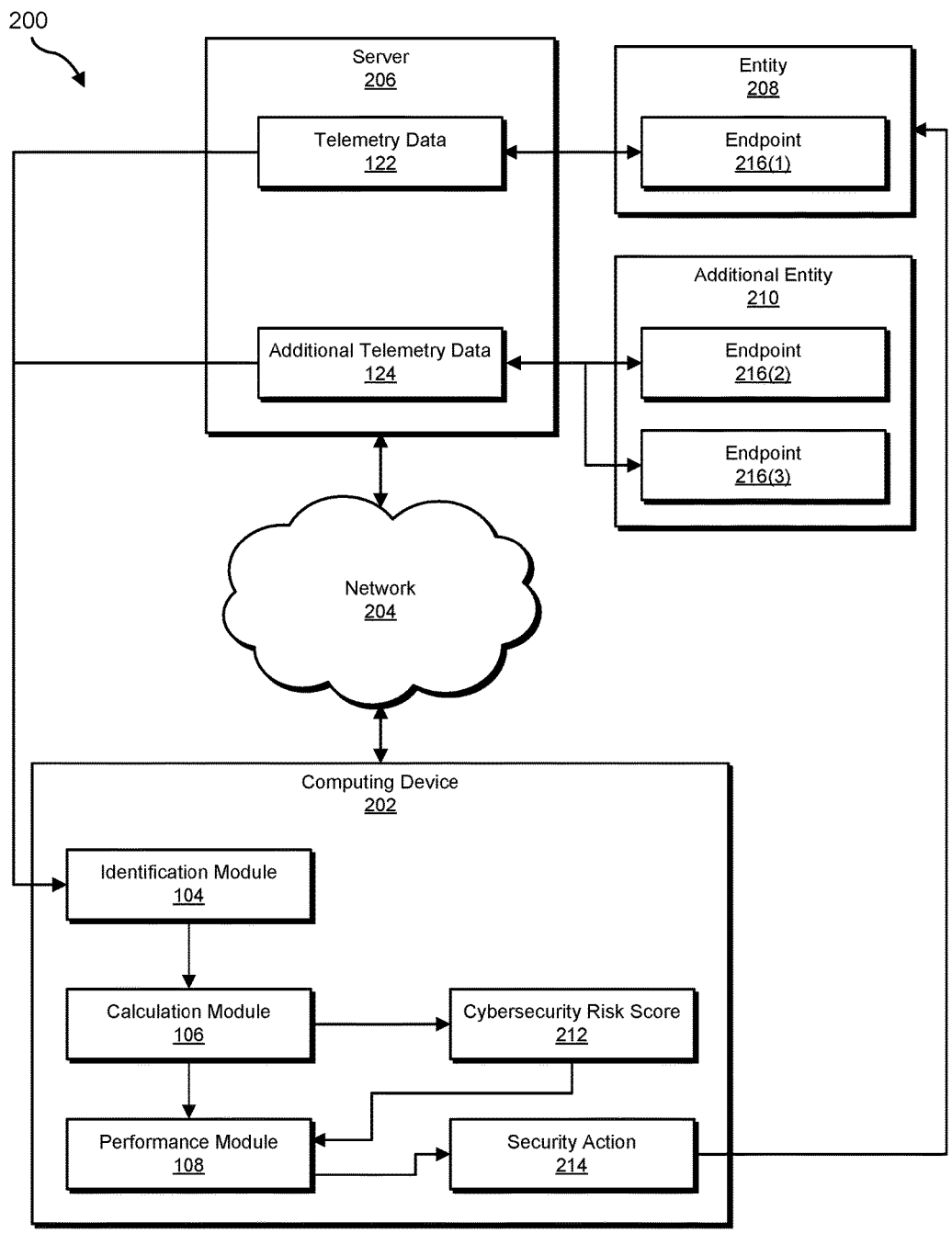
FIG. 2 is a block diagram of an additional representative system for evaluating cybersecurity risk.

The following will provide, with reference to FIGS. 1 and 2, detailed descriptions of representative systems for evaluating cybersecurity risk. Detailed descriptions of corresponding computer-implemented methods will also be provided in connection with FIG. 3. In addition, detailed descriptions of a representative calculation of a cybersecurity risk score will be provided in connection with FIG. 4. Furthermore, a representative computing system and network architecture capable of implementing one or more of the embodiments described herein will be provided in connection with FIGS. 5 and 6, respectively.

FIG. 1 is a block diagram of representative system 100 for evaluating cybersecurity risk. As illustrated in this figure, representative system 100 may include one or more modules 102 for performing one or more tasks. For example, and as will be explained in greater detail below, representative system 100 may include an identification module 104 that may identify telemetry data collected from endpoints of an entity. As used herein, the term "telemetry data" generally refers to automatically collected data transmitted from an entity to a receiving device, usually via a network. The term "endpoint," as used herein, generally refers to a device or a component capable of connecting to a network.

Representative system 100 may also include a calculation module 106 that calculates a cybersecurity risk score for the entity by searching the telemetry data for information indicative of cybersecurity risk exposure of the entity. Calculation module 106 may also perform an actuarial analysis on the information indicative of the cybersecurity risk exposure to quantize a potential consequence of the cybersecurity risk exposure. The term "cybersecurity risk," as used herein, generally refers to a risk of unauthorized access or manipulation of computing resources (e.g., desktop computers, laptop computers, portable devices, network devices, digital data, etc.).

Representative system 100 may further include a performance module 108 that performs, based on the cybersecurity risk score, a security action to protect the entity from the potential consequence of the cybersecurity risk exposure. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of representative network architecture 600 in FIG. 6. One or more of modules 102 in FIG. 1 may also represent all or portions of one or more special-purpose computers configured to perform one or more tasks.

As illustrated in FIG. 1, representative system 100 may also include one or more databases, such as database 120. In one example, database 120 may be configured to store telemetry data 122 and additional telemetry data 124, which may include information indicative of cybersecurity risk for various entities.

Database 120 may represent portions of a single database or computing device or a plurality of databases or computing devices. For example, database 120 may represent a portion of server 206 in FIG. 2, computing system 510 in FIG. 5, and/or portions of representative network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of representative network architecture 600 in FIG. 6.

Representative system 100 in FIG. 1 may be implemented in a variety of ways. For example, all or a portion of system 100 may represent portions of representative system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both server 206 and computing device 202 may be merged into a single machine or computing system such that the functionality of each of modules 102 is provided within a single device.

In one embodiment, one or more of modules 102 from FIG. 1 may, when executed by at least one processor of computing device 202 and/or server 206, enable computing device 202 and/or server 206 to predict a chance of cyber attack on an entity. For example, and as will be described in greater detail below, identification module 104 may identify telemetry data 122 collected from endpoints of an entity 208, such as an endpoint 216(1). Although illustrated as part of a single system, computing device 202 and/or server 206 may represent third-party systems (e.g., a third-party service provider), and some or all of modules 102 may execute on an endpoint of entity 208 (e.g., endpoint 216(1)) or additional entities. Calculation module 106 may calculate a cybersecurity risk score 212 for entity 208 by searching telemetry data 122 for information indicative of cybersecurity risk exposure of entity 208 and perform an actuarial analysis on the information indicative of the cybersecurity risk exposure to quantize a potential consequence of the cybersecurity risk exposure. Performance module 108 may perform, based on cybersecurity risk score 212, a security action 214 to protect entity 208 from the potential consequence of the cybersecurity risk exposure.

In the example of FIG. 2, and as will be explained in greater detail below, computing device 202 may first identify telemetry data 122 for entity 208 on server 206 via network 204. Computing device 202 may also identify additional telemetry data 124 for an additional entity 210. Computing device 202 may then search telemetry data 122 and/or additional telemetry data 124 and perform an actuarial analysis to calculate cybersecurity risk score 212 for entity 208. Finally, computing device 202 may perform security action 214 on entity 208 based on cybersecurity risk score 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, representative computing system 510 in FIG. 5, or any other suitable computing device.

Server 206 generally represents any type or form of computing device that is capable of receiving, storing, and/or managing telemetry information about various entities. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), representative network architecture 600 in FIG. 6, or the like. Network 204 may facilitate communication or data transfer using wireless or wired connections. In one embodiment, network 204 may facilitate communication between computing device 202 and server 206.

Figure 3:
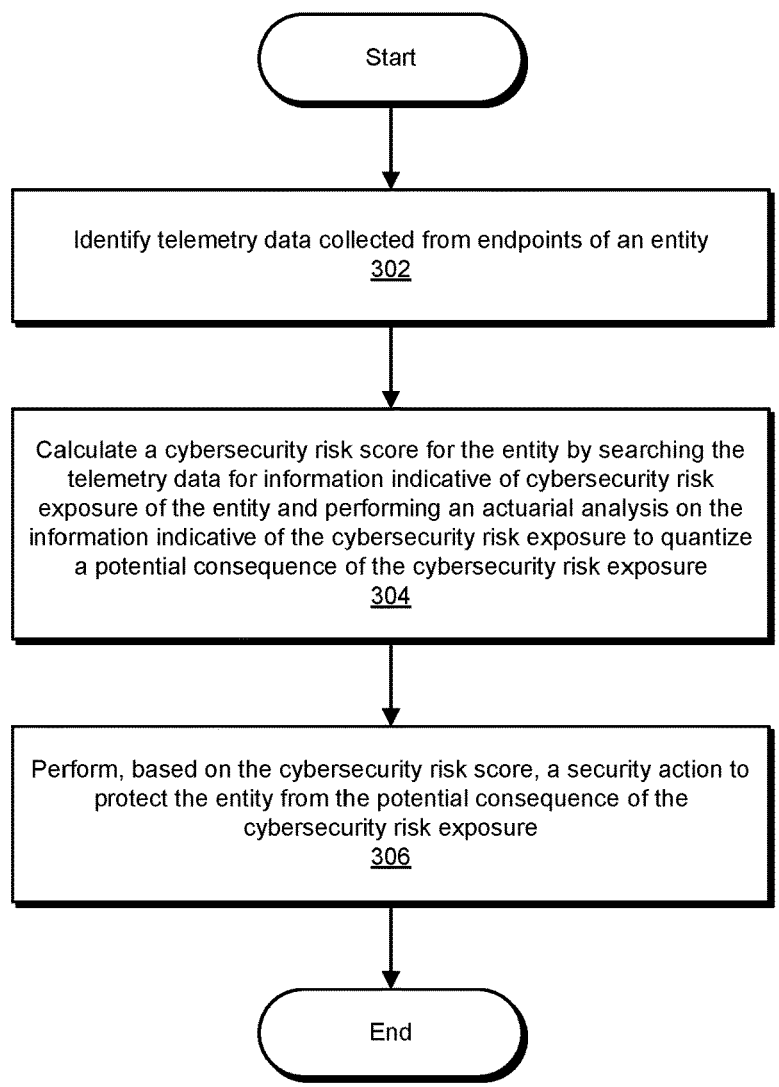
FIG. 3 is a flow diagram of a representative method for evaluating cybersecurity risk.

FIG. 3 is a flow diagram of a representative computer-implemented method 300 for evaluating cybersecurity risk. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of representative network architecture 600 in FIG. 6.

As illustrated in FIG. 3, at step 302, one or more of the systems described herein may identify telemetry data collected from endpoints of an entity. For example, identification module 104 may, as part of computing device 202 in FIG. 2, identify telemetry data 122 collected from endpoint 216(1) of entity 208.

Identification module 104 may identify telemetry data 122 in a variety of ways. In some embodiments, identification module 104 may identify telemetry data 122 by searching database 120 on server 206 for information related to entity 208. Examples of entity 208 may include, without limitation, a computing device, a server, a network of devices, an organization, an industry sector, or any other entity with a potential for cybersecurity risk. In other embodiments, identification module 104 may search a database of entity 208, another database similar to database 120, or a third-party database. The systems described herein may alternatively collect telemetry data 122 directly and/or indirectly from endpoint 216(1) of entity 208 or endpoints of additional entities, such as endpoints 216(2) and 216(3) of additional entity 210.

Furthermore, in some examples such as the example of FIG. 2, identification module 104 may identify additional telemetry data 124 collected from endpoints 216(2) and 216(3) of additional entity 210. Additional entity 210 may have similar attributes to entity 208. For example, entity 208 and additional entity 210 may both be computing devices in the same group or organization. In another example, entity 208 and additional entity 210 may be organizations in the same industry sector, and therefore have similar cybersecurity threats. Additionally or alternatively, identification module 104 may identify telemetry data 122 from one or more other entities with relevant information on cybersecurity risk.

Returning to FIG. 3, at step 304, one or more of the systems described herein may calculate a cybersecurity risk score for the entity by searching the telemetry data for information indicative of cybersecurity risk exposure of the entity and performing an actuarial analysis on the information indicative of the cybersecurity risk exposure to quantize a potential consequence of the cybersecurity risk exposure. For example, calculation module 106 may, as part of computing device 202 in FIG. 2, calculate cybersecurity risk score 212 for entity 208 by searching telemetry data 122 for information indicative of cybersecurity risk exposure of entity 208 and performing an actuarial analysis on the information indicative of the cybersecurity risk exposure to quantize a potential consequence of the cybersecurity risk exposure of entity 208.

Calculation module 106 may calculate cybersecurity risk score 212 in a variety of ways. In one embodiment, as in the example of FIG. 2, calculation module 106 may further search additional telemetry data 124 for the information indicative of cybersecurity risk exposure of entity 208. In this embodiment, additional telemetry data 124 may indicate similar cybersecurity risk of additional entity 210 that may apply to entity 208.

In one example, the information indicative of the cybersecurity risk exposure may include information indicative of a historical risk of cyber attacks on entity 208, a current risk of cyber attacks on entity 208, and a value of entity 208. In this example, the information indicative of the historical risk of cyber attacks may include information about a previous attack on entity 208, a previous attack on a similar entity, such as additional entity 210, and/or a remediation of the previous attack. For example, the information indicative of the historical risk may include a count of historical attacks in different categories of threats to entity 208 and the amount of time taken to remediate each attack.

Additionally, the information indicative of the current risk of cyber attacks on entity 208 may include a security risk posed by a third-party entity with access to a resource of entity 208 and/or a security practice of entity 208. Examples of the third-party entity may include, without limitation a similar entity, such as additional entity 210, an application or program, or a person with access to entity 208. For example, the information indicative of the current risk may include a list of vulnerable third-party vendors with access to entity 208 and the likelihood of an attack from each third-party vendor. This information may also include behavioral information on individuals or organizations that may indicate a potential threat, such as an employee forgetting to lock a workstation. Additionally, the information about the security practice of entity 208 may include technology and/or security policies used by entity 208.

Furthermore, in the above example, the information indicative of the value of entity 208 may include information indicative of a value of a digital asset of entity 208 and/or a reputation of entity 208. For example, the information indicative of the value of entity 208 may include a list of digital assets of entity 208 and the financial value of the assets, such as the number of computing devices owned by an organization. In another example, the reputation of entity 208 may include a perceived value of entity 208, such as the brand reputation of a company. The systems described herein may also use methods of reputation analysis to determine the reputation value of entity 208. The reputation analysis may also include an analysis of private data provided by clients of the systems described herein and/or other intellectual property data that may not be publicly disclosed.

In some embodiments, calculation module 106 may perform the actuarial analysis by extracting features from the information indicative of the cybersecurity risk exposure and using the extracted features to train a prediction model to calculate cybersecurity risk score 212 for entity 208. The term "feature," as used herein, generally refers to a format or clustering of data that allows it to be measured and/or interpreted, particularly in prediction modeling. Examples of features may include numerical data that quantizes a factor, textual data used in pattern recognition, graphical data, or any other format that may be analyzed using statistical methods or machine learning. The term "prediction model," as used herein, generally refers to a result of machine learning that may recognize data patterns and predict a result based on known values. In these embodiments, the prediction model may be trained using features extracted from historical data on entity 208 and/or data on similar entities, such as additional entity 210. Calculation module 106 may then use the trained prediction model to specifically evaluate features of entity 208 and calculate cybersecurity risk score 212 predicting future risk.

Figure 4:
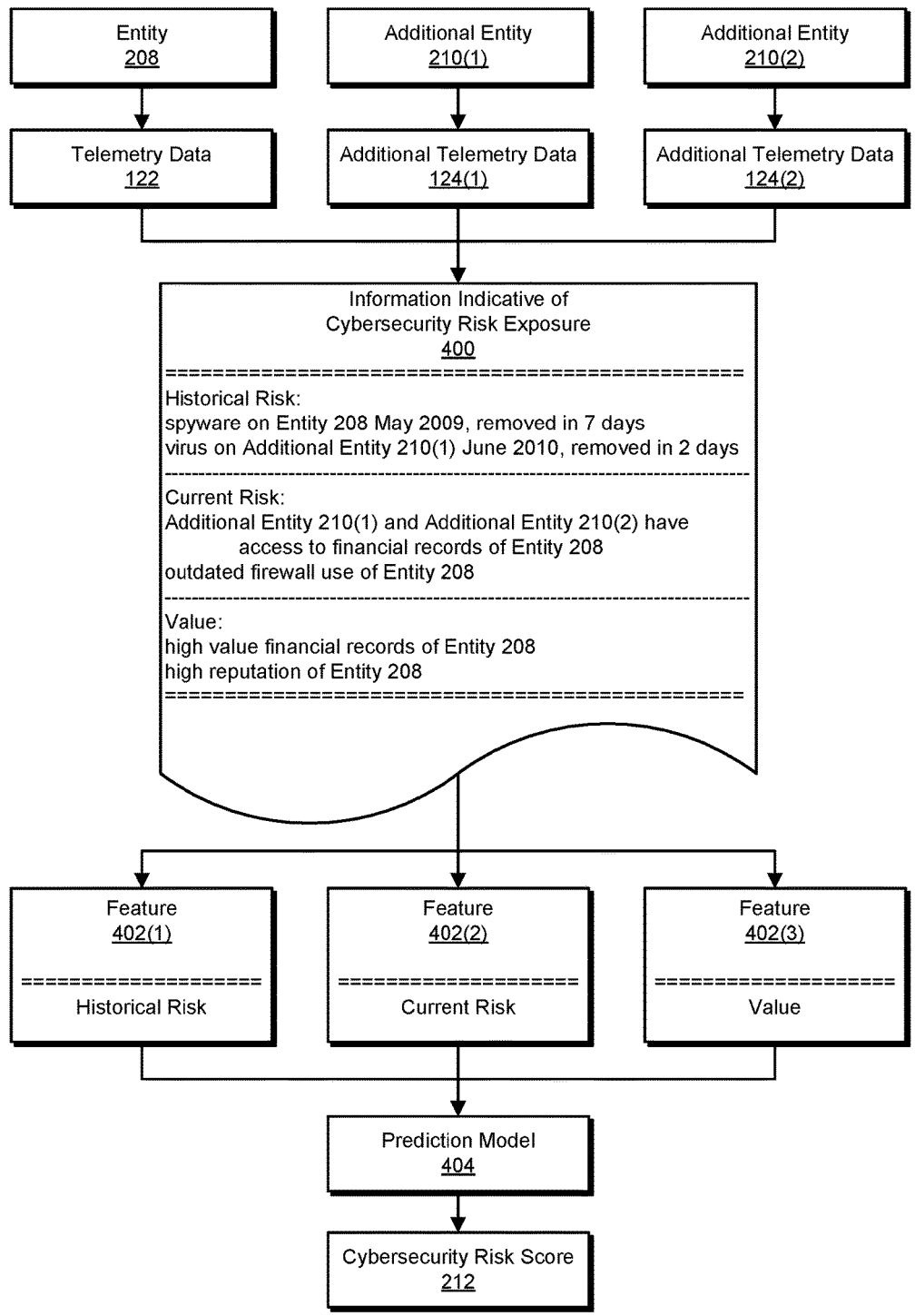
FIG. 4 is a block diagram of a representative calculation of a cybersecurity risk score.

For example, as shown in FIG. 4, telemetry data 122, additional telemetry data 124(1), and additional telemetry data 124(2) may be collected from entity 208, an additional entity 210(1), and an additional entity 210(2), respectively. Additional entity 210(1) may be a similar entity to entity 208, and additional entity 210(2) may be a third-party entity with access to entity 208. For example, entity 208 may be a server storing financial data, additional entity 210(1) may be another server linked to entity 208, and additional entity 210(2) may be a computing device with access to data stored on entity 208. Calculation module 106 may then search the data for information indicative of cybersecurity risk exposure 400, which may include information on historical attacks on entity 208 and additional entity 210(1), current risk due to access to entity 208 by additional entity 210(1) and additional entity 210(2) and security software of entity 208, and value derived from assets of entity 208 and a reputation of entity 208.

Additionally, calculation module 106 may extract a feature 402(1) (e.g., historical risk), a feature 402(2) (e.g., current risk), and a feature 402(3) (e.g., value) from information indicative of cybersecurity risk exposure 400. A prediction model 404 may then predict cybersecurity risk score 212 from features 402(1), 402(2), and 402(3) to determine a risk of entity 208 being attacked in the future. Cybersecurity risk score 212 may indicate a high risk to entity 208 based on information indicative of cybersecurity risk exposure 400.

Furthermore, in one embodiment, calculation module 106 may calculate cybersecurity risk score 212 for entity 208 by aggregating individual cybersecurity risk scores of component entities that comprise entity 208 into an overall score. For example, entity 208 may be an organization with multiple computing devices. Calculation module 106 may aggregate cybersecurity risk scores of the computing devices to determine cybersecurity risk score 212 for the organization as a whole. In another example, entity 208 may be an industry sector, and calculation module 106 may aggregate cybersecurity risk scores of companies within the industry sector. Calculation module 106 may also validate cybersecurity risk score 212 by comparison against historical risk data of entities similar to entity 208 and/or a distribution of risk scores of similar entities.

Returning to FIG. 3, at step 306, one or more of the systems described herein may perform, based on the cybersecurity risk score, a security action to protect the entity from the potential consequence of the cybersecurity risk exposure. For example, performance module 108 may, as part of computing device 202 in FIG. 2, perform, based on cybersecurity risk score 212, security action 214 to protect entity 208 from the potential consequence of the cybersecurity risk exposure.

Performance module 108 may perform security action 214 in a variety of ways. In some examples, performance module 108 may use cybersecurity risk score 212 to derive a cost of insuring entity 208 against cyber attacks. For example, performance module 108 may determine that cybersecurity risk score 212 is a relatively high score and the cost of insuring entity 208 is a high cost. Performance module 108 may also send cybersecurity risk score 212 to an insurer or an insurance application and subsequently receive the cost of insuring entity 208 from the insurer.

In some embodiments, the systems described herein may include determining that cybersecurity risk score 212 is above a risk threshold, and performance module 108 may perform security action 214 by automatically increasing cybersecurity protection within entity 208 in response to determining that cybersecurity risk score 212 is above the risk threshold. In the example of FIG. 4, performance module 108 may update firewall security for entity 208 after determining cybersecurity risk score 212 is too high. In other examples, performance module 108 may prevent risky behavior of third-party entities by restricting access to entity 208. For example, performance module 108 may prevent a user who does not follow security policies from accessing sensitive data stored on entity 208.

As explained above in connection with method 300 in FIG. 3, the disclosed systems and methods may, by utilizing telemetry data collected about various entities, derive a cybersecurity risk score predicting future potential risk of cyber attack to a particular entity. For example, the disclosed systems and methods may determine a cybersecurity risk of an organization in order to evaluate a cost to insure the organization. Specifically, the disclosed systems and methods may first identify telemetry data that includes information about a historical record of cyber attacks, a current evaluation of cybersecurity vulnerabilities, and a value of the entity. For example, the systems and methods described herein may identify historical attacks on a company and other similar companies and the remediation of those attacks. The systems and methods described herein may also identify risks to the company due to third parties and security problems with existing technology and practices, such as a policy of password use by employees of the company or the security posture of a vendor of the company. Furthermore, the systems and methods described herein may calculate the value of the company using an evaluation of assets and reputation of the company.

After determining information related to historical threat, vulnerabilities, and value of various entities, the disclosed systems and methods may use the information to train a prediction model to determine future risk of the entity. In the example above, the disclosed systems and methods may use the prediction model to assign a risk score to the company that reflects the likelihood of a cyber attack on the company. Alternatively, the disclosed systems and methods may aggregate risk scores of components, such as the risk scores of individual workstations in a company, in order to determine a total score for the whole entity. The systems and methods described herein may then use the risk score to calculate a cost of insuring the entity. The disclosed systems and methods may also increase cybersecurity for the entity to decrease future risk.

As detailed above, by training a prediction model using historical data, the disclosed systems and methods may calculate future cybersecurity risk for an entity of any given size. In addition, by assessing various factors that may affect the security of an entity, including both technological and behavioral factors, the disclosed systems and methods may provide more comprehensive analyses of risk. Thus, the systems and methods described herein may improve the accuracy of cybersecurity risk evaluations.

Figure 5:
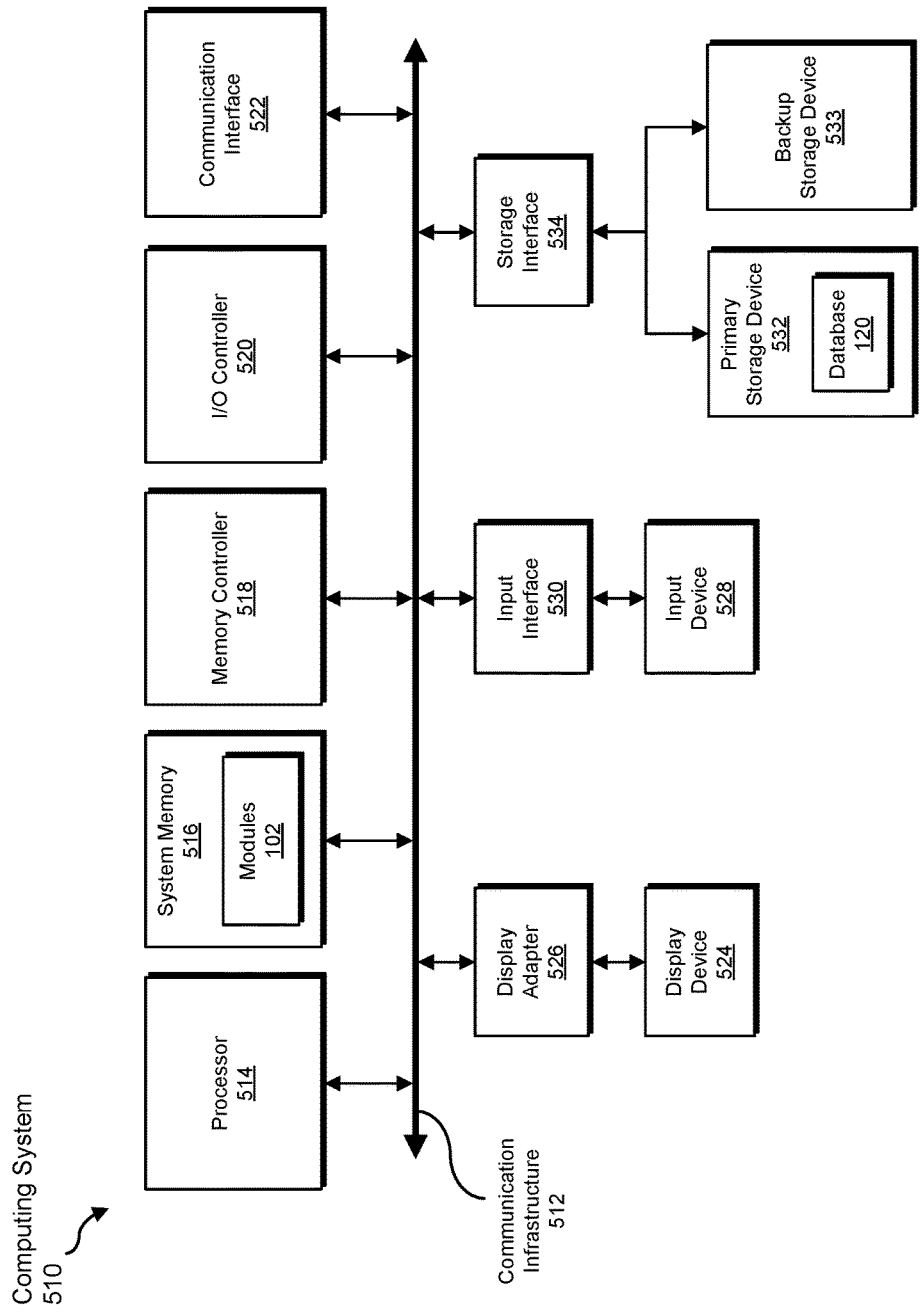
FIG. 5 is a block diagram of a representative computing system capable of implementing one or more of the embodiments described and/or illustrated herein.

FIG. 5 is a block diagram of a representative computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the representative embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, representative computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between representative computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, representative computing system 510 may also include at least one input device 528 coupled to communication infrastructure 512 via an input interface 530. Input device 528 generally represents any type or form of input device capable of providing input, either computer or human generated, to representative computing system 510. Examples of input device 528 include, without limitation, a keyboard, a pointing device, a speech recognition device, or any other input device.

As illustrated in FIG. 5, representative computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the representative embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the representative embodiments described and/or illustrated herein. Additionally or alternatively, one or more of the representative embodiments described and/or illustrated herein may be implemented in firmware and/or hardware. For example, computing system 510 may be configured as an Application Specific Integrated Circuit (ASIC) adapted to implement one or more of the representative embodiments disclosed herein.

Figure 6:
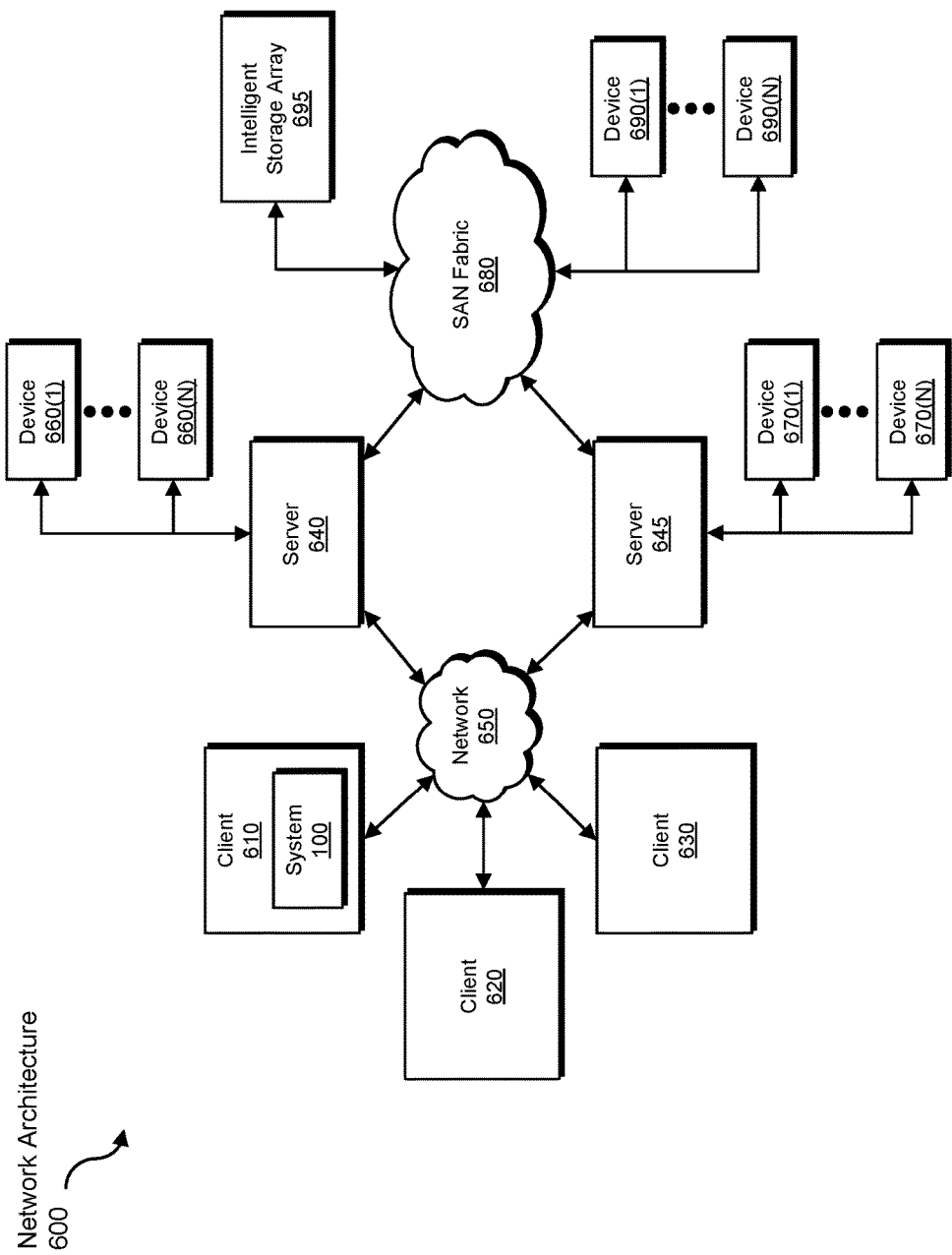
FIG. 6 is a block diagram of a representative computing network capable of implementing one or more of the embodiments described and/or illustrated herein.

FIG. 6 is a block diagram of a representative network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as representative computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to representative computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the representative embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the representative embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of a representative method for evaluating cybersecurity risk.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered representative in nature since many other architectures can be implemented to achieve the same functionality.

In some examples, all or a portion of system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of representative system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of representative system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various representative methods described and/or illustrated herein may also omit one or more of the steps described or illustrated herein or include additional steps in addition to those disclosed.

While various embodiments have been described and/or illustrated herein in the context of fully functional computing systems, one or more of these representative embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the representative embodiments disclosed herein.

In addition, one or more of the modules described herein may transform data, physical devices, and/or representations of physical devices from one form to another. For example, one or more of the modules recited herein may receive telemetry data to be transformed, transform the telemetry data, output a result of the transformation to a storage or output device, use the result of the transformation to calculate a cybersecurity risk score, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the representative embodiments disclosed herein. This representative description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for evaluating cybersecurity risk, at least a portion of the method being performed by a computing device comprising at least one processor, the method comprising:
    identifying, by the at least one processor of the computing device, telemetry data collected from endpoints of an entity;
    calculating, by the at least one processor of the computing device, a cybersecurity risk score for the entity, wherein the cybersecurity risk score comprises an overall score aggregating individual cybersecurity risk scores of component entities that comprise the entity, by:
        searching the telemetry data for information indicative of cybersecurity risk exposure of the entity and a value of the entity, based on a perceived or financial value of the entity; and
        performing an actuarial analysis on the information indicative of the cybersecurity risk exposure and the value of the entity to quantize a potential consequence of the cybersecurity risk exposure; and
    based on the cybersecurity risk score, initiating a security action, by the at least one processor of the computing device, to protect the entity from the potential consequence of the cybersecurity risk exposure by automatically increasing cybersecurity protection within the entity.

2. The method of claim 1, further comprising identifying additional telemetry data collected from endpoints of at least one additional entity, wherein searching the telemetry data comprises searching the additional telemetry data for the information indicative of cybersecurity risk exposure of the entity.

3. The method of claim 1, wherein the information indicative of the cybersecurity risk exposure comprises information indicative of:
    a historical risk of cyber attacks on the entity; and
    a current risk of cyber attacks on the entity.

4. The method of claim 3, wherein the information indicative of the historical risk of cyber attacks comprises information about at least one of:
  a previous attack on the entity;
  a previous attack on a similar entity; and
  a remediation of the previous attack.

5. The method of claim 3, wherein the information indicative of the current risk of cyber attacks on the entity comprises at least one of:
  a security risk posed by a third-party entity with access to a resource of the entity; and
  a security practice of the entity.

6. The method of claim 1, wherein the information indicative of the value of the entity comprises at least one of:
  information indicative of a value of a digital asset of the entity; and
  a reputation of the entity.

7. The method of claim 1, wherein performing the actuarial analysis comprises:
  extracting features from the information indicative of the cybersecurity risk exposure; and
  using the extracted features to train a prediction model to calculate the cybersecurity risk score for the entity.

8. The method of claim 1, wherein initiating the security action comprises using the cybersecurity risk score to derive a cost of insuring the entity against cyber attacks.

9. The method of claim 1, further comprising determining that the cybersecurity risk score is above a risk threshold, wherein initiating the security action comprises automatically increasing cybersecurity protection within the entity in response to determining that the cybersecurity risk score is above the risk threshold.

10. The method of claim 1, further comprising calculating the cybersecurity risk score for the entity by aggregating individual cybersecurity risk scores of component entities that comprise the entity into an overall score.

11. A system for evaluating cybersecurity risk, the system comprising:
  an identification module, stored in memory, that identifies telemetry data collected from endpoints of an entity;
  a calculation module, stored in memory, that calculates a cybersecurity risk score for the entity, wherein the cybersecurity risk score comprises an overall score aggregating individual cybersecurity risk scores of component entities that comprise the entity, by:
    searching the telemetry data for information indicative of cybersecurity risk exposure of the entity and a value of the entity, based on a perceived or financial value of the entity; and
    performing an actuarial analysis on the information indicative of the cybersecurity risk exposure and the value of the entity to quantize a potential consequence of the cybersecurity risk exposure;
  a performance module, stored in memory, that initiates, based on the cybersecurity risk score, a security action to protect the entity from the potential consequence of the cybersecurity risk exposure by automatically increasing cybersecurity protection within the entity; and
  at least one processor that executes the identification module, the calculation module, and the performance module.

12. The system of claim 11, wherein the identification module further identifies additional telemetry data collected from endpoints of at least one additional entity, wherein the calculation module searches the telemetry data by searching the additional telemetry data for the information indicative of cybersecurity risk exposure of the entity.

13. The system of claim 11, wherein the information indicative of the cybersecurity risk exposure comprises information indicative of:
  a historical risk of cyber attacks on the entity; and
  a current risk of cyber attacks on the entity.

14. The system of claim 13, wherein the information indicative of the historical risk of cyber attacks comprises information about at least one of:
  a previous attack on the entity;
  a previous attack on a similar entity; and
  a remediation of the previous attack.

15. The system of claim 13, wherein the information indicative of the current risk of cyber attacks on the entity comprises at least one of:
  a security risk posed by a third-party entity with access to a resource of the entity; and
  a security practice of the entity.

16. The system of claim 11, wherein the information indicative of the value of the entity comprises at least one of:
  information indicative of a value of a digital asset of the entity; and
  a reputation of the entity.

17. The system of claim 11, wherein the calculation module performs the actuarial analysis by:
  extracting features from the information indicative of the cybersecurity risk exposure; and
  using the extracted features to train a prediction model to calculate the cybersecurity risk score for the entity.

18. The system of claim 11, wherein the performance module initiates the security action by using the cybersecurity risk score to derive a cost of insuring the entity against cyber attacks.

19. The system of claim 11, further comprising determining that the cybersecurity risk score is above a risk threshold, wherein the performance module initiates the security action by automatically increasing cybersecurity protection within the entity in response to determining that the cybersecurity risk score is above the risk threshold.

20. A non-transitory computer-readable medium comprising one or more computer-executable instructions that, when executed by at least one processor of a computing device, cause the computing device to:
  identify telemetry data collected from endpoints of an entity;
  calculate a cybersecurity risk score for the entity, wherein the cybersecurity risk score comprises an overall score aggregating individual cybersecurity risk scores of component entities that comprise the entity, by:
    searching the telemetry data for information indicative of cybersecurity risk exposure of the entity and a value of the entity, based on a perceived or financial value of the entity; and
    performing an actuarial analysis on the information indicative of the cybersecurity risk exposure and the value of the entity to quantize a potential consequence of the cybersecurity risk exposure; and
  initiate, based on the cybersecurity risk score, a security action to protect the entity from the potential consequence of the cybersecurity risk exposure by automatically increasing cybersecurity protection within the entity.

\* \* \* \* \*